US012572918B2

(12) United States Patent
    Sasaki

(10) Patent No.: US 12,572,918 B2
(45) Date of Patent: Mar. 10, 2026

(54) COMMODITY REGISTRATION SYSTEM

(71) Applicant: TOSHIBA TEC KABUSHIKI KAISHA, Tokyo (JP)

(72) Inventor: Yuta Sasaki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 18/495,786

(22) Filed: Oct. 27, 2023

(65) Prior Publication Data

US 2024/0386410 A1      Nov. 21, 2024

(30) Foreign Application Priority Data

May 19, 2023    (JP) ................................. 2023-083305

(51) Int. Cl.
    *G06Q 20/20*          (2012.01)
    *G06K 7/10*           (2006.01)
(52) U.S. Cl.
    CPC ....... *G06Q 20/208* (2013.01); *G06K 7/10792* (2013.01); *G06K 7/10861* (2013.01)
(58) Field of Classification Search
    CPC ......................... G06Q 20/208; G06K 7/10792
    See application file for complete search history.

(56) References Cited

U.S. PATENT DOCUMENTS

2005/0189411 A1*  9/2005  Ostrowski ................ G07G 3/00
                                                        235/383
2018/0218351 A1*  8/2018  Chaubard ............ G07G 1/0081
2019/0392505 A1  12/2019  Amemura
2020/0079412 A1*  3/2020  Ramanathan ........ G08B 13/248

* cited by examiner

*Primary Examiner* — Allen C Chein
(74) *Attorney, Agent, or Firm* — Amin, Turocy & Watson, LLP

(57) ABSTRACT

Provided is a commodity registration system by which occurrence of erroneous registration of a commodity can be reduced. The commodity registration system includes: an imaging unit provided in a housing unit configured to house a commodity that is a purchase target, an inside of the housing unit being included in an imaging area; a specifying unit configured to recognize a commodity from an image captured by the imaging unit and specify the commodity to be housed in the housing unit based on the recognition result; a registration unit configured to register the commodity specified by the specifying unit as the commodity that is the purchase target; and a changing unit configured to change, based on a quantity of commodities registered by the registration unit or the image, a recognition area in the image from which the specifying unit recognizes a commodity.

18 Claims, 8 Drawing Sheets

| COMMODITY CODE | COMMODITY INFORMATION | | | |
|---|---|---|---|---|
| | COMMODITY NAME | PRICE | VOLUME INFORMATION | ... |

| COMMODITY CODE | QUANTITY | ... |
|---|---|---|

Figure 6:
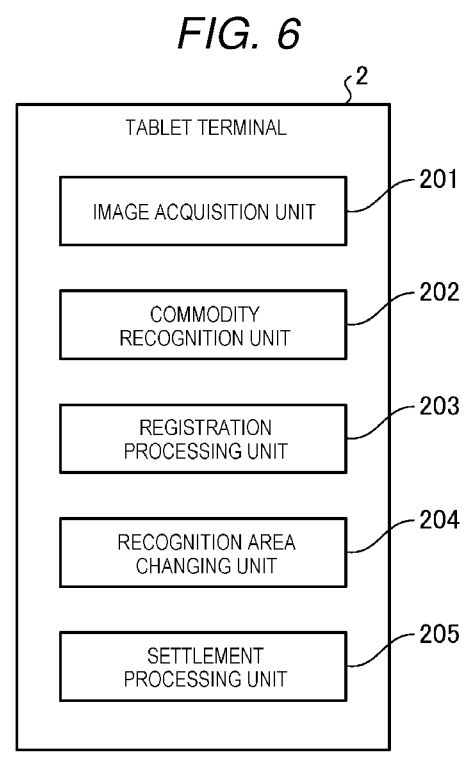

TABLET TERMINAL

| IMAGE ACQUISITION UNIT | 201 |

| COMMODITY RECOGNITION UNIT | 202 |

| REGISTRATION PROCESSING UNIT | 203 |

| RECOGNITION AREA CHANGING UNIT | 204 |

| SETTLEMENT PROCESSING UNIT | 205 |

FIG. 11

COMMODITY REGISTRATION SYSTEM

CROSS-REFERENCE TO RELATED APPLICATION

This application is based upon and claims the benefit of priority from Japanese Patent Application No. 2023-083305, filed May 19, 2023, the entire contents of which are incorporated herein by reference.

FIELD

Embodiments described herein relate to a commodity registration system and a method of reducing an erroneous registration of a commodity.

BACKGROUND

There is a technology that can specify a commodity from a captured image by providing an imaging device at a position at which a shopping cart or a basket (hereinafter, also referred to as a housing unit) into which a commodity to be purchased is placed can be imaged in a store for selling commodities, and imaging a commodity when the commodity is housed in the housing unit. In such a technique, a customer can register the specified commodity as a transaction target by performing an operation of housing the commodity in the housing unit.

In addition, the above-described imaging device is disposed above the housing unit or in a vicinity of an edge of an opening of the housing unit, and an imaging direction is set such that an inside of the housing unit is included in an imaging area so as to capture, from above, an image of tray-shaped commodities such as packed lunch and side dishes that are less likely to tilt.

In the above-described configuration in the related art, since the imaging device causes an inside of the housing unit to be included in the imaging area, the registered commodity may enter the imaging area depending on a quantity of commodities stored in the housing unit, and erroneous registration of registering the registered commodity again may occur. Therefore, a technique that can reduce the occurrence of erroneous registration of a commodity is desired.

DESCRIPTION OF THE DRAWINGS

FIG. 3 is a diagram showing an example of a hardware configuration of a tablet terminal;

FIG. 4 is a diagram showing an example of a data configuration of a commodity master;

FIG. 5 is a diagram showing an example of a data configuration of a sales registration table;

FIG. 6 is a diagram showing an example of a functional configuration of the tablet terminal;

FIG. 11 is a side view showing an example of a schematic configuration of a shopping cart according to Modification 1.

DETAILED DESCRIPTION

In general, according to one embodiment, a commodity registration system by which occurrence of erroneous registration of a commodity can be reduced is provided.

According to one embodiment, a commodity registration system includes: an imaging unit provided in a housing unit configured to house a commodity that is a purchase target, an inside of the housing unit being included in an imaging area; a specifying unit configured to recognize a commodity from an image captured by the imaging unit and specify the commodity to be housed in the housing unit based on the recognition result; a registration unit configured to register the commodity specified by the specifying unit as the commodity that is the purchase target; and a changing unit configured to change, based on a quantity of commodities registered by the registration unit or the image, a recognition area in the image from which the specifying unit specifies a commodity. According to another embodiment, a method of reducing an erroneous registration of a commodity involves housing a commodity that is a purchase target in a housing component comprising an imaging component, an inside of the housing component being included in an imaging area; recognizing a commodity from an image captured by the imaging component and specifying a commodity to be housed in the housing component based on the recognition result; registering the commodity specified as the commodity that is the purchase target; and changing, based on a quantity of commodities registered or the image, a recognition area in the image from which recognizing a commodity occurs.

Hereinafter, a commodity registration device and a program according to the present embodiment will be described in detail with reference to the accompanying drawings. In the embodiment, a terminal device (hereinafter, also referred to as a cart terminal) attached to a commodity transporting cart (hereinafter, also referred to as a shopping cart) used in a store is described as an example of the commodity registration device. The disclosure is not limited to this application example.

Figure 1:
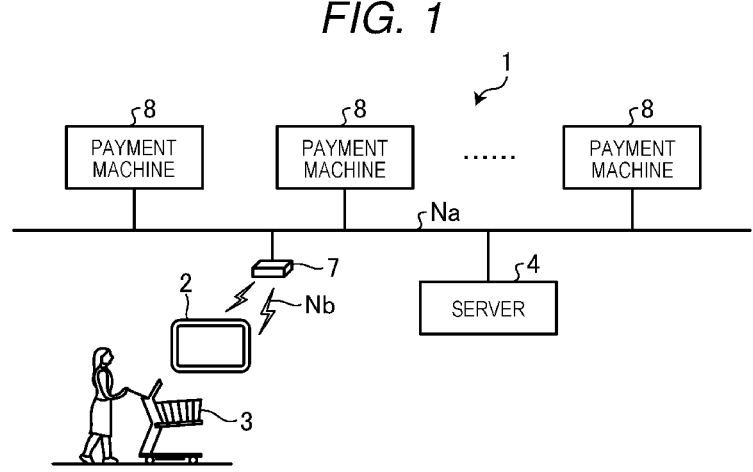
FIG. 1 is a diagram showing an example of a schematic configuration of a system according to an embodiment.

FIG. 1 is a diagram showing an example of a schematic configuration of a system 1 according to the embodiment. As shown in FIG. 1, the system 1 includes a tablet terminal 2, a server 4, and payment machines 8. The server 4 and the payment machine 8 are communicably connected to each other via a network Na.

As the network Na, the Internet, a virtual private network (VPN), a local area network (LAN), a public communication network, a mobile communication network, or the like can be used alone or in combination as appropriate. For example, the Internet and a mobile communication network are used in combination as the network Na.

A wireless access point 7 is connected to the network Na. The wireless access point 7 is connected to the tablet terminal 2 via a network Nb such as a wireless LAN. Therefore, the tablet terminal 2 can communicate with the server 4 and the payment machines 8.

The shopping cart 3 includes a housing unit 31 (see FIG. 2) that houses a commodity displayed in a store. An upper portion of the housing unit 31 is opened, and the commodity is placed in the housing unit 31 from above. A customer borrows the shopping cart 3 in the store, and places, in the housing unit 31, a commodity to be purchased from among displayed commodities while walking around the store together with the shopping cart 3.

The tablet terminal 2 is detachably provided in the shopping cart 3. The tablet terminal 2 recognizes a commodity to be housed in the housing unit 31 from an image captured by an imaging unit 34 which will be described later, and executes sales registration processing related to the commodity. Here, the sales registration processing means processing for setting, as a purchase target, a commodity specified by the tablet terminal 2. Specifically, the sales registration processing refers to processing of registering information on the recognized commodity (hereinafter, also referred to as sales registration data) in a sales registration table 242 which will be described later. For example, sales registration data is registered in the sales registration table 242 in the sales registration processing. The sales registration data includes a commodity code by which an item or the like of a commodity can be identified or the quantity of commodities to be purchased.

When receiving an operation for the customer to perform payment with the payment machine 8, the tablet terminal 2 executes processing for transferring the sales registration data for one transaction to the payment machine 8. For example, the tablet terminal 2 encodes the sales registration data in a code symbol such as a two-dimensional code and displays the code symbol. In this case, the payment machine 8 acquires the sales-registered sales registration data for one transaction in the tablet terminal 2 by reading the code symbol displayed on the tablet terminal 2, and executes payment processing based on the sales registration data.

The server 4 uses the tablet terminal 2 as a user interface terminal to perform information processing for providing a service for a sales transaction of a commodity in a store where the user interface terminal is used. The server 4 may be, for example, a store server provided in a store or a server device provided outside the store. In the present embodiment, the server 4 is implemented by a single device, and may be a cloud server (or a cloud system) implemented by a plurality of devices connected to each other via a network.

The server 4 is an information processing device having a computer configuration, which includes a processor, a main storage device, an auxiliary storage device, and the like. The server 4 stores, for example, a commodity master, in which a commodity name, a price, and the like of a commodity to be sold in a store are registered, in a database (not shown) or the like, and provides the commodity master to the tablet terminal 2 or the payment machine 8.

The payment machine 8 is a payment device provided in a store. The payment machine 8 executes settlement processing for a commodity based on the sales registration data. The settlement processing refers to processing of calculating and displaying coin based on display of a total amount and a tax amount of commodities related to one transaction, and a deposit received from a customer, processing of dispensing a receipt on which commodity information and settlement information (total amount, deposited amount, coin amount, and the like) are printed, and the like.

Figure 2:
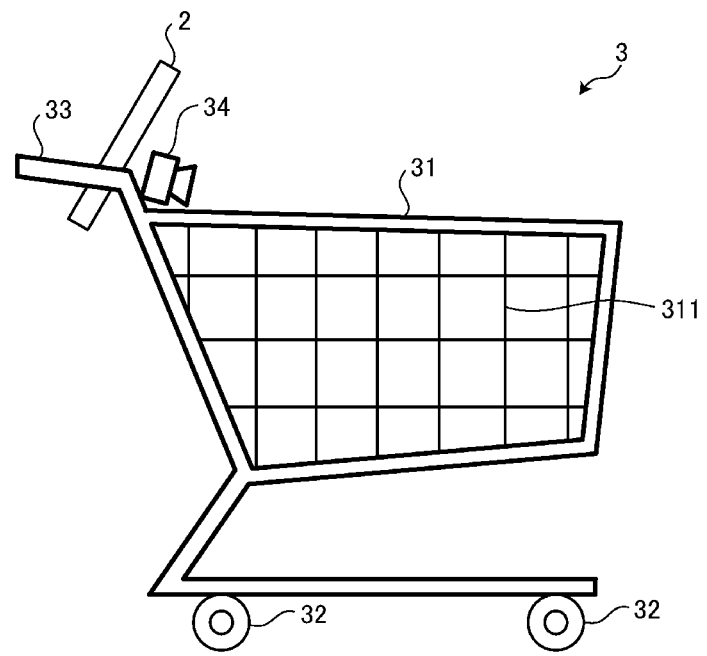
FIG. 2 is a side view showing an example of a schematic configuration of a shopping cart.

Next, the shopping cart 3 will be described. FIG. 2 is a side view showing an example of a schematic configuration of the shopping cart 3. The shopping cart 3 includes the cage-shaped housing unit 31 having an open upper surface, rotation casters 32 disposed below the housing unit 31, and a handle unit 33 coupled to the housing unit 31 and the casters 32 and gripped by a customer when the shopping cart 3 is moved.

The housing unit 31 has a configuration in which side surface portions and a bottom surface portion are surrounded by a mesh-shaped lattice 311 in a substantially quadrangular shape. A commodity housed in the housing unit 31 can be viewed from the outside. The side surface portions and the bottom surface portion may be formed not by the mesh-shaped lattice 311 but by wall surfaces.

The shopping cart 3 further detachably includes the tablet terminal 2 in a vicinity of the handle unit 33. The shopping cart 3 includes the imaging unit 34 in a vicinity of an edge of an opening of the housing unit 31. The imaging unit 34 is an example of an imaging unit, and is implemented by a digital camera or the like. The imaging unit 34 is disposed such that an imaging direction is directed toward the opening of the housing unit 31. That is, the imaging direction is set such that at least a part of the imaging area of the imaging unit 34 includes the inside of the housing unit 31.

The imaging unit 34 captures an image of a commodity to be housed in the housing unit 31 and a commodity picked up from the housing unit 31, and outputs the captured image to the tablet terminal 2. Here, an image means a still image or a video in units of frames.

Figure 3:
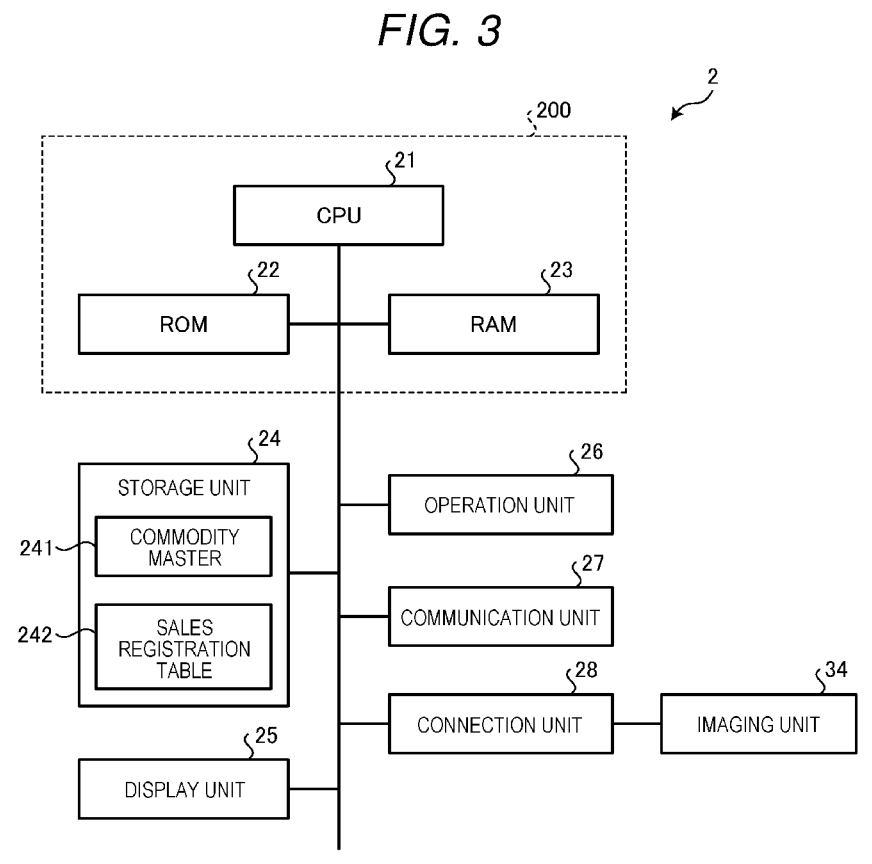

Here, a hardware configuration of the tablet terminal 2 will be described. FIG. 3 is a diagram showing an example of the hardware configuration of the tablet terminal 2.

As shown in FIG. 3, the tablet terminal 2 includes a central processing unit (CPU) 21, a read only memory (ROM) 22, a random access memory (RAM) 23, a storage unit 24, a display unit 25, an operation unit 26, a communication unit 27, a connection unit 28, and the like.

The CPU 21 is an example of a processor and comprehensively controls an operation of the tablet terminal 2. The ROM 22 stores various programs. The RAM 23 is a workspace in which programs and various kinds of data are loaded.

The CPU 21, the ROM 22, and the RAM 23 are connected to each other via a bus or the like to constitute a control unit 200 having a computer configuration. In the control unit 200, the CPU 21 executes various kinds of processing when the CPU 21 operates in accordance with programs stored in the ROM 22 or the storage unit 24 and loaded in the RAM 23.

The storage unit 24 includes a storage medium such as an HDD or a flash memory, and maintains storage contents even when a power supply is cut off. The storage unit 24 stores programs that can be executed by the CPU 21 and various kinds of setting information. The storage unit 24 stores a commodity master 241, a sales registration table 242, and the like.

The commodity master 241 is a data table for managing commodities to be sold in a store. The sales registration table 242 is a data table for managing a sales-registered commodity by using the tablet terminal 2.

The display unit 25 is a display device such as a liquid crystal display (LCD). The display unit 25 displays various kinds of information under the control of the CPU 21. The operation unit 26 is an input device such as a keyboard and a pointing device. The operation unit 26 outputs an operation content, which is input via the input device, to the CPU 21. The operation unit 26 may be a touch panel provided on the display unit 25.

The communication unit 27 is a wired or wireless communication interface that can be connected to the network Nb. The communication unit 27 is communicably connected to the wireless access point 7 via the network Nb. The control unit 200 communicates with the server 4 and the payment machine 8 via the communication unit 27.

The connection unit 28 is an interface for connecting peripheral devices. The connection unit 28 is a wired or wireless interface conforming to standards such as a universal serial bus (USB) and a Bluetooth (registered trademark). In the present embodiment, the connection unit 28 is connected to the imaging unit 34.

Figures 4, 5:
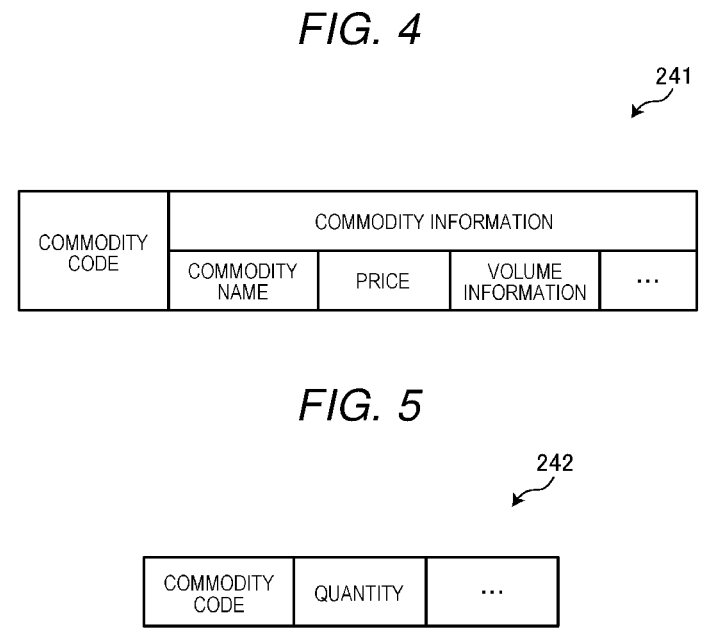

FIG. 4 is a diagram showing an example of a data configuration of the commodity master 241. As shown in FIG. 4, the commodity master 241 stores s commodity code and commodity information in correlation with each other. The commodity code is an example of identification information by which the kind of a commodity to be sold in the store can be identified. As the commodity code, for example, a JAN code or the like can be used. The commodity information is information on a commodity corresponding to the commodity code. For example, a commodity name, a price, volume information, and the like are registered on the commodity information. Here, the volume information is information indicating a size of the commodity corresponding to the commodity code. For example, information indicating the volume or capacity of commodities including the package is registered.

The data configuration of the commodity master 241 is not limited to that shown in FIG. 4. For example, feature information indicating a feature on an appearance of a commodity corresponding to the commodity code may be registered in correlation with the commodity code. Such feature information can be used as matching information when a commodity is recognized from an image. The feature information may be an image representing an appearance of a commodity or a feature data quantitatively indicating a feature on an appearance of a commodity.

The tablet terminal 2 holds the commodity master 241 in the present embodiment, and there is no limitation on this example. The server 4 may hold the commodity master 241. In this case, each tablet terminal 2 can manage, by referring to the commodity master 241 held by the server 4, the commodity master 241 in the same manner as in the form of being locally held.

FIG. 5 is a diagram showing an example of a data configuration of the sales registration table 242. As shown in FIG. 5, the sales registration table 242 stores a commodity ID and the quantity in correlation with each other. The commodity ID is a commodity ID of a sales-registered commodity and corresponds to the commodity ID in the commodity master 241. The quantity is the registration quantity of the same sales-registered commodity. For example, 1 is registered in the column of the quantity in a default state.

The data configuration of the sales registration table 242 is not limited to that shown in FIG. 5. For example, commodity information corresponding to the commodity ID may be registered in correlation with the commodity ID. In addition, date and time information indicating a registration date and time may be registered in correlation with the commodity ID.

The tablet terminal 2 holds the sales registration table 242 in the present embodiment, and there is no limitation on this example. The server 4 may hold the sales registration table 242. In this case, the server 4 can manage the sales registration table 242 for each transaction by, for example, dispensing a transaction ID by which each transaction performed in each tablet terminal 2 can be identified, and holding the sales registration table 242 in correlation with the transaction ID.

Specifically, the server 4 notifies the tablet terminal 2 of the dispensed transaction ID to hold the transaction ID in the tablet terminal 2 while the transaction corresponding to the transaction ID is performed. Then, the tablet terminal 2 transmits the commodity ID of the commodity to be subjected to sales registration to the server 4 together with the transaction ID, and instructs the server 4 to register the commodity ID in the sales registration table 242 corresponding to the transaction ID. Accordingly, the server 4 can collectively manage sales-registered commodities in the tablet terminals 2. It is assumed that the tablet terminal 2 can refer to the sales registration table 242 for a transaction related to the tablet terminal 2.

Next, a functional configuration of the tablet terminal 2 will be described. FIG. 6 is a diagram showing an example of the functional configuration of the tablet terminal 2.

As shown in FIG. 6, the tablet terminal 2 includes an image acquisition unit 201, a commodity recognition unit 202, a registration processing unit 203, a recognition area changing unit 204, and a settlement processing unit 205 as the functional configuration.

The functional configuration of the tablet terminal 2 is a software configuration implemented by the processor in the tablet terminal 2 operating in accordance with a program stored in the ROM or the storage unit, and is not limited to the software configuration. For example, a part or all of the functional configuration of the tablet terminal 2 may be in a form implemented by a hardware such as dedicated circuits.

The image acquisition unit 201 acquires, via the connection unit 28, an image captured by the imaging unit 34. The commodity recognition unit 202 is an example of a specifying unit. The commodity recognition unit 202 specifies, based on the image acquired by the image acquisition unit 201, the commodity whose image is captured by the imaging unit 34. Specifically, when an image of a commodity is captured by the imaging unit 34 as a result of the commodity entering the imaging area of the imaging unit 34, the commodity recognition unit 202 recognizes the commodity by using a known object recognition technique or the like to specify a commodity code of the commodity. Note that the commodity recognition unit 202 recognizes and decodes a code symbol attached to a commodity to specify a commodity code held in the code symbol.

Here, a relation between the imaging area of the imaging unit 34 and the recognition area in which the commodity recognition unit 202 recognizes a commodity from an image will be described with reference to FIGS. 7 and 8. Here, FIGS. 7 and 8 are diagrams schematically showing the relation between the imaging area of the imaging unit 34 and the recognition area of the commodity recognition unit 202.

Figure 7:
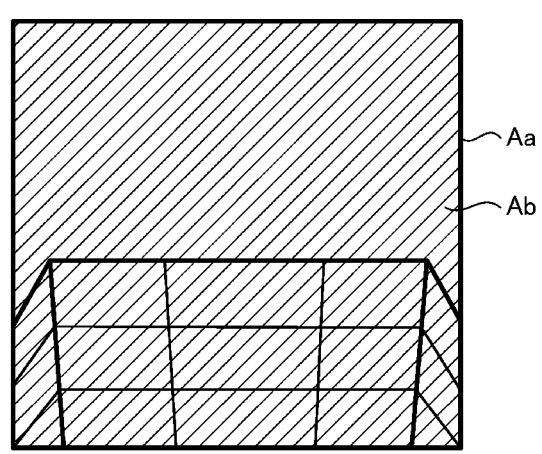
FIG. 7 is a diagram schematically showing a relation between an imaging area of an imaging unit and a recognition area of a commodity recognition unit.

In FIG. 7, a rectangular frame area indicates the imaging area Aa. The imaging area Aa is set to include the inside of the housing unit 31. That is, an image captured by the imaging unit 34 includes the inside of the housing unit 31.

In addition, in the imaging area Aa, a hatched area indicates the recognition area Ab of the commodity recognition unit 202. That is, FIG. 7 shows that the entire area of the image captured by the imaging unit 34 is the recognition area Ab. The recognition area Ab is in an inclusion relation with the imaging area Aa are (Ab ⊂ Aa).

Figure 8:
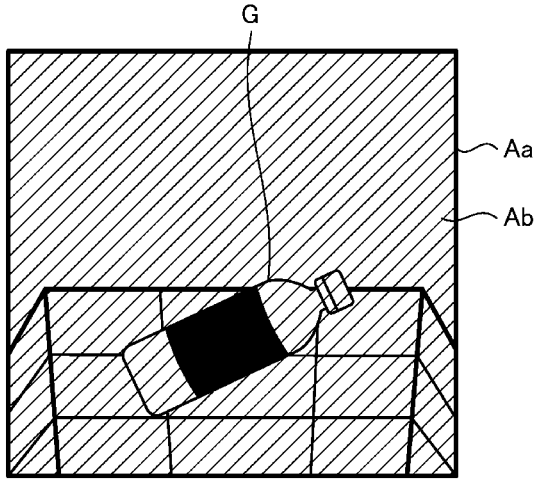
FIG. 8 is a diagram schematically showing a relation between the imaging area of the imaging unit and the recognition area of the commodity recognition unit.

When a customer picks up a commodity that the customer desires to purchase from a display shelf and places the commodity in the housing unit 31, a commodity G enters the imaging area Aa of the imaging unit 34 as shown in FIG. 8.

The commodity recognition unit 202 recognizes the commodity G from the recognition area Ab of the image, that is, the entire area of the image among images acquired by the image acquisition unit 201.

When the commodity recognition unit 202 recognizes the commodity G from the image, the commodity recognition unit 202 detects, from temporally continuous images, a direction in which the commodity G is moved. Specifically, the commodity recognition unit 202 detects a motion (for example, a motion vector) of the commodity G relative to the housing unit 31. That is, the commodity recognition unit 202 detects information by which whether the commodity G is housed in the housing unit 31 or the commodity G is picked up from the housing unit 31 can be determined. It is assumed that the commodity recognition unit 202 specifies a commodity code once for a commodity recognized from a series of images.

Referring back to FIG. 6, the registration processing unit 203 is an example of a registration unit. The registration processing unit 203 executes sales registration processing of the commodity specified by the commodity recognition unit 202. Specifically, when the commodity recognition unit 202 recognizes the commodity and detects that the commodity is moved downward, the registration processing unit 203 determines that the commodity is housed in the housing unit 31. In this case, the registration processing unit 203 registers, in the sales registration table 242, the commodity code and the quantity of the commodity specified by the commodity recognition unit 202. Specifically, every time the same commodity is registered, the registration processing unit 203 adds 1 to the quantity of the commodity. When the registration processing unit 203 reads a commodity name and price of the commodity corresponding to the registered commodity code from the commodity master 241, the registration processing unit 203 displays sales-registered commodities in a list in a registration order by displaying the commodity name and the price together with the quantity on the display unit 25.

When the commodity recognition unit 202 recognizes the commodity and detects that the commodity is moved upward, the registration processing unit 203 determines that the commodity is picked up from the housing unit 31. In this case, the registration processing unit 203 deletes the commodity code of the commodity specified by the commodity recognition unit 202 from the sales registration table 242, or subtracts 1 from the registration quantity. Specifically, when the registration quantity is 0, the registration processing unit 203 deletes the commodity code of the commodity from the sales registration table 242. In addition, the registration processing unit 203 deletes, from the commodities displayed in a list, the display of the commodity deleted from the sales registration table 242 or subtracts the quantity to notify the commodity whose sales registration is cancelled.

As described above, in the system 1, when the customer places the commodity in the housing unit 31, sales registration of the commodity is automatically performed. In the system 1, when the customer picks up the commodity from the housing unit 31, registration cancellation of the commodity is automatically performed.

The commodity housed in the housing unit 31 is being held in the housing unit 31, and therefore, a space occupied by the commodity in the housing unit 31 is increased as the number of the commodities to be housed increases. In addition, when a large-size commodity is housed in the housing unit 31, the space occupied by the commodity in the housing unit 31 is also increased. In this case, if the commodity housed in the housing unit 31 enters the recognition area Ab of the commodity recognition unit 202, the commodity recognition unit 202 recognizes the commodity housed in the housing unit 31 as a new commodity even though the commodity housed in the housing unit 31 is already registered. Thus, erroneous registration, that is, multiple sales registration performed by the registration processing unit 203 may occur.

Therefore, in the present embodiment, the recognition area changing unit 204 performs processing for reducing the occurrence of the above-described erroneous registration by changing the recognition area Ab of the commodity recognition unit 202 based on a quantity of the commodity housed in the housing unit 31 derived from the sales-registered commodities. The recognition area changing unit 204 is an example of a changing unit.

Specifically, the recognition area changing unit 204 reads, from the commodity master 241, volume information on a commodity corresponding to each of commodity codes registered in the sales registration table 242. Next, the recognition area changing unit 204 calculates a total volume of commodities housed in the housing unit 31 by adding values of the read volume information. Here, the total volume of the commodities is an example of information indicating a state of the commodities housed in the housing unit 31. Then, the recognition area changing unit 204 changes the recognition area Ab in accordance with the calculated total volume.

Figure 9:
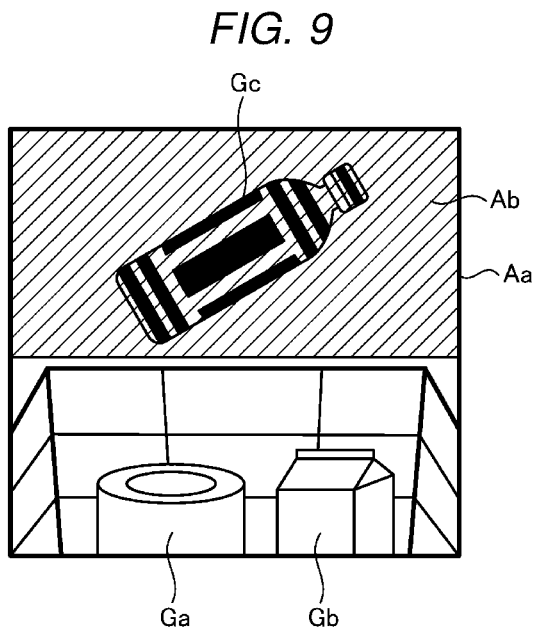
FIG. 9 is a diagram schematically showing a relation between the imaging area of the imaging unit and the recognition area of the commodity recognition unit.

FIG. 9 is a diagram showing the operation of the recognition area changing unit 204, and shows a relation between the imaging area Aa of the imaging unit 34 and the recognition area Ab of the commodity recognition unit 202. In FIG. 9, two commodities Ga and Gb are stored in the housing unit 31.

In this case, the recognition area changing unit 204 changes the recognition area Ab in accordance with a total volume of the commodities Ga and Gb. As an example, the recognition area changing unit 204 changes the recognition area Ab when the total volume exceeds a predetermined threshold. FIG. 9 shows an example in which a remaining area (upper half of the imaging area Aa) obtained by excluding an area representing the housing unit 31 from the imaging area Aa is set as the recognition area Ab.

Accordingly, in the tablet terminal 2, the registered commodities Ga and Gb housed in the housing unit 31 can be excluded from the recognition targets, and therefore, the occurrence of the erroneous registration can be prevented. In the tablet terminal 2, the area above the housing unit 31 is set as the recognition area Ab, and therefore, the newly housed commodity Gc can be recognized, and the commodity Gc can be subjected to the sales registration.

In the above-described example, the recognition area Ab is changed based on one threshold, and the recognition area Ab may be changed (reduced or enlarged) in multiple stages by providing thresholds in multiple stages. In addition, the recognition area Ab may be dynamically changed (reduced or enlarged) following a change in the total volume.

In addition, in the above-described example, the recognition area Ab is changed based on the total volume of the sales-registered commodities, and the recognition area Ab may be changed by using another index. For example, the recognition area Ab may be changed based on the total number of sales-registered commodities. Here, the total number of commodities is an example of information indicating a state of the commodities housed in the housing unit 31.

Also in this case, the recognition area Ab may be changed (reduced or enlarged) based on one or a plurality of thresholds, or the recognition area Ab may be dynamically changed (reduced or enlarged) following a change in the total number.

Referring back to FIG. 6, the settlement processing unit 205 executes, in response to an operation of the customer, processing related to the settlement of the sales-registered commodity. Specifically, the settlement processing unit 205 inputs data by which the sales-registered commodity can be specified to the payment machine 8, so that a state in which the settlement can be performed by the payment machine 8 is implemented.

For example, if the settlement processing unit 205 receives, via the operation unit 26, an operation instructing start of the settlement, the settlement processing unit 205 codes the sales registration data registered in the sales registration table 242 into a code symbol such as a two-dimensional code and displays the code symbol on the display unit 25. In this case, the payment machine 8 acquires the sales registration data by reading the code symbol displayed on the display unit 25 of the tablet terminal 2, and executes, based on the acquired sales registration data, the payment processing of the sales-registered commodity for one transaction.

For example, the settlement processing unit 205 may transmit sales registration data registered in the sales registration table 242 to the payment machine 8 by the near field communication such as Bluetooth (registered trademark). In this case, the payment machine 8 acquires the sales registration data transmitted from the tablet terminal 2, and executes, based on the acquired sales registration data, the payment processing of the sales-registered commodity for one transaction.

For example, in the case of a configuration in which the sales registration table 242 is held in the server 4, the settlement processing unit 205 codes a transaction ID of the transaction into a code symbol such as a bar code and a two-dimensional code and displays the code symbol on the display unit 25. In this case, the payment machine 8 acquires the transaction ID by reading the code symbol displayed on the display unit 25 of the tablet terminal 2. Then, the payment machine 8 acquires the sales registration data related to the acquired transaction ID from the server 4, and executes the payment processing of the sales-registered commodities for one transaction based on the acquired sales registration data.

The settlement of the commodity is not limited to the method in which the payment machine 8 is used, and may be performed by the tablet terminal 2. For example, if the settlement processing unit 205 receives, via the operation unit 26, an operation instructing start of the settlement, the settlement processing unit 205 displays, on the display unit 25, a screen by which a settlement method such as electronic money settlement and credit settlement can be selected. If the settlement method is selected, the settlement processing unit 205 receives an input of settlement information for performing the settlement by the selected settlement method, and cooperates with an external settlement server to execute, based on the input settlement information, settlement processing for settling a total amount of the sales-registered commodities. The settlement information may be, for example, a credit card number or a two-dimensional code for code settlement. In the case of a two-dimensional code for the code settlement, an input may be received via the imaging unit 34.

Figure 10:
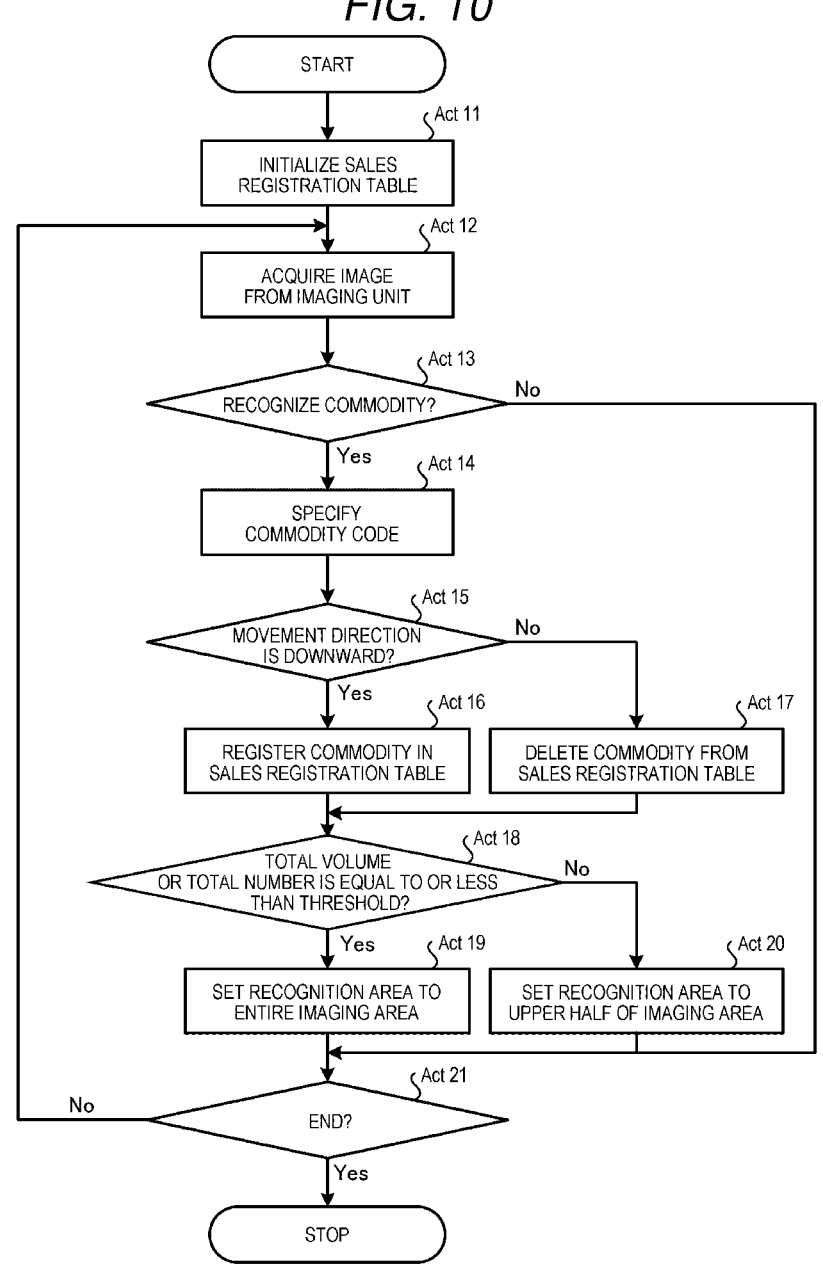
FIG. 10 is a flowchart showing an example of processing performed by the tablet terminal.

Hereinafter, an operation example of the tablet terminal 2 will be described with reference to FIG. 10. FIG. 10 is a flowchart showing an example of processing performed by the tablet terminal 2. It is assumed that the recognition area Ab of the commodity recognition unit 202 is equivalent to the imaging area Aa of the imaging unit 34. In the present processing, an operation example in which the recognition area Ab of the commodity recognition unit 202 is changed based on one threshold will be described.

First, if the control unit 200 of the tablet terminal 2 starts the present processing in response to an operation via the operation unit 26, the control unit 200 initializes the sales registration table 242 (Act 11).

When the server 4 holds the sales registration table 242, the control unit 200 causes the server 4 to hold the sales registration table 242 related to a transaction ID of the transaction by requesting dispensation of the transaction ID from the server 4. The control unit 200 acquires the dispensed transaction ID from the server 4 and stores the transaction ID in the RAM 23 or the like.

Subsequently, the image acquisition unit 201 acquires an image from the imaging unit 34 (Act 12). Next, the commodity recognition unit 202 determines whether a commodity is recognized from the recognition area Ab of the image acquired in Act 12 (Act 13). If the commodity is not recognized (Act 13; No), the processing proceeds to Act 21.

If the commodity recognition unit 202 recognizes the commodity from the recognition area Ab of the image acquired in Act 12 (Act 13; Yes), the commodity recognition unit 202 specifies a commodity code of the commodity (Act 14). Next, the commodity recognition unit 202 determines a movement direction of the recognized commodity (Act 15). Here, if the movement direction of the commodity is downward toward the housing unit 31 (Act 15; Yes), the registration processing unit 203 registers the commodity specified in Act 14 in the sales registration table 242 (Act 16) and proceeds to Act 18. If the movement direction of the commodity is upward from the housing unit 31 (Act 15; No), the registration processing unit 203 deletes the commodity specified in Act 14 from the sales registration table 242 (Act 17) and proceeds to Act 18.

Subsequently, the recognition area changing unit 204 determines whether a total volume or a total number of commodities registered in the sales registration table 242 is equal to or less than a threshold (Act 18). Here, if it is determined that the total volume or the total value thereof is equal to or less than the threshold (Act 18; Yes), the recognition area changing unit 204 sets the recognition area Ab of the commodity recognition unit 202 to the entire imaging area Aa (Act 19), and the processing proceeds to Act 21. If it is determined that the total volume or the total value thereof exceeds the threshold (Act 18; No), the recognition area changing unit 204 sets the recognition area Ab of the commodity recognition unit 202 to an upper half of the imaging area Aa excluding the housing unit 31 (Act 20), and the processing proceeds to Act 21.

Subsequently, the control unit 200 determines whether the end of the sales registration is instructed (Act 21). If the end of the sales registration is not instructed (Act 21; No), the control unit 200 returns the processing to Act 12. If the end of the sales registration is instructed (Act 21; Yes), the control unit 200 ends the present processing.

As described above, the system 1 includes: the imaging unit 34 provided in the housing unit 31 that houses a commodity that is a purchase target, the inside of the housing unit being included in the imaging area; the commodity recognition unit 202 of the tablet terminal 2 that recognizes the commodity from an image captured by the imaging unit 34 and specifies the commodity to be housed in the housing unit 31 based on the recognition result; and the registration processing unit 203 of the tablet terminal 2 that registers the specified commodity as the commodity that is the purchase target. In addition, the recognition area changing unit 204 of the tablet terminal 2 changes the recognition area of the registration processing unit 203 based on the information related to the commodity registered by the registration processing unit 203.

Accordingly, in the system 1, when a registered commodity enters the imaging area of the imaging unit 34, the recognition area changing unit 204 changes the recognition area based on a quantity of commodities housed in the housing unit 31, so that only the registered commodity can be excluded from the recognition area. Therefore, the occurrence of erroneous registration of a commodity can be reduced in the system 1.

The above-described embodiment may also be modified and implemented as appropriate by changing a part of the configuration or the function of each device described above. Hereinafter, plural modifications of the above-described embodiment will be described as other embodiments. In the following description, differences from the above-described embodiment will be mainly described, and detailed description of points common to those described above will be omitted. In addition, modifications described below may be individually implemented or may be implemented in combination as appropriate.

Modification 1

Figure 11:
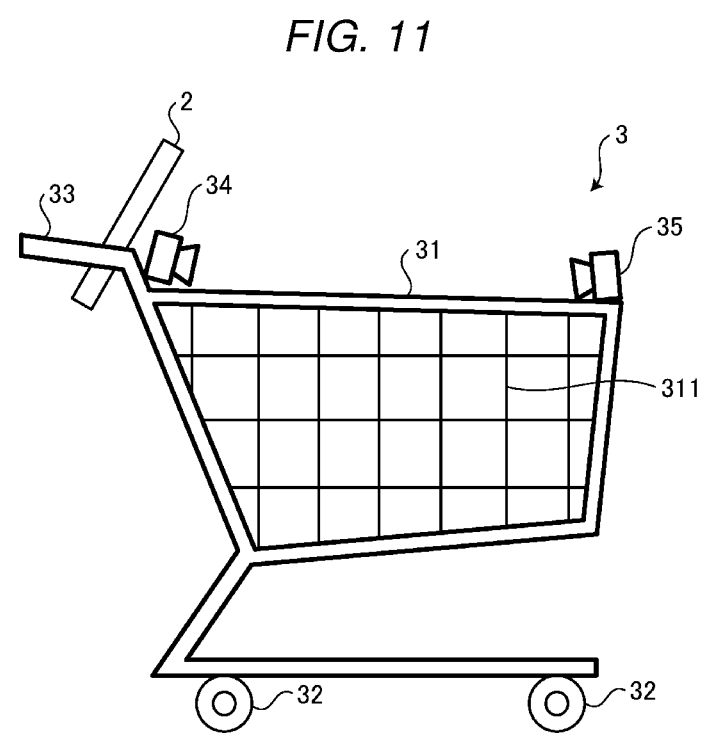

The number of the imaging units 34 attached to the shopping cart 3 is one in the above-described embodiment, and is not limited to one. A plurality of imaging units 34 may be provided. For example, as shown in FIG. 11, another imaging unit 35 may be provided at a position different from that of the imaging unit 34. Here, FIG. 11 is a side view showing an example of a schematic configuration of the shopping cart 3 according to Modification 1.

Similar to the imaging unit 34, the imaging unit 35 is disposed such that an imaging direction of the imaging unit 35 is directed to the opening of the housing unit 31 and at least a part of an imaging area includes the inside of the housing unit 31. The imaging unit 35 is connected to the tablet terminal 2 and outputs an image obtained by imaging to the tablet terminal 2.

In this case, the image acquisition unit 201 of the tablet terminal 2 acquires an image captured by each of the imaging unit 34 and the imaging unit 35. The commodity recognition unit 202 performs recognition and identification of a commodity from the image captured by each of the imaging unit 34 and the imaging unit 35. The registration processing unit 203 performs sales registration of the commodity specified by the commodity recognition unit 202.

In this case, in order to prevent the multiple registration of a commodity, the registration processing unit 203 performs the sales registration of the commodity only when a common commodity code is specified from images captured by the imaging unit 34 and the imaging unit 35 or when the commodity code is registered from either one of the images captured by the imaging unit 34 and the imaging unit 35. In this case, when registering the commodity, the registration processing unit 203 may perform registration in combination information (hereinafter referred to as acquisition source information) indicating acquisition sources (the imaging unit 34 and the imaging unit 35) of images with which the commodity is specified. When different commodity codes are specified from the images of the imaging unit 34 and the imaging unit 35, the registration processing unit 203 does not perform the sales registration and displays a message notifying an error on the display unit 25.

The recognition area changing unit 204 changes the recognition area Ab of the commodity recognition unit 202 based on a total volume or a total number of sales-registered commodities as in the above-described embodiment. However, a plurality of imaging units are provided, and therefore, the recognition area changing unit 204 changes the recognition area Ab for each of the imaging unit 34 and the imaging unit 35. In this case, the recognition area changing unit 204 may change the recognition area Ab in the same manner for each of the imaging unit 34 and the imaging unit 35, or may individually change the recognition area Ab therefor. In the latter case, for example, the recognition area changing unit 204 calculates, based on the acquisition source information registered in the sales registration table 242, the total volume or the total number of the sales-registered commodities for each acquisition source of the image. Then, the recognition area changing unit 204 individually changes the recognition area Ab related to each of the imaging unit 34 and the imaging unit 35 based on the calculation result.

Accordingly, the recognition area Ab related to the imaging unit that images the site can be individually changed in the tablet terminal 2, for example, when the commodity housed in the housing unit 31 is housed in a state of being biased to a site at a part in the housing unit 31. Therefore, in the tablet terminal 2 according to the present modification, the recognition area Ab can be set according to a housing situation of the commodity in the housing unit 31. Thus, occurrence of erroneous registration can be prevented, and the commodity can be efficiently recognized.

Modification 2

The imaging area Aa of the imaging unit 34 is fixed in the above-described embodiment, and there is no limitation on this example. For example, the imaging area Aa may be moved in an up-down direction. In this case, for example, the imaging unit 34 may include a drive unit such as an actuator by which an imaging direction of the imaging unit 34 can be moved up and down. The drive unit may be driven in response to a drive signal received from the tablet terminal 2.

In this case, the registration processing unit 203 of the tablet terminal 2 changes the imaging area Aa of the imaging unit 34, that is, the recognition area Ab by outputting an instruction signal for driving the drive unit to the imaging unit 34 in accordance with the total volume or the total number of the sales-registered commodities. Specifically, the registration processing unit 203 outputs a drive signal for moving the imaging unit 34 upward when the total volume or the total number of the sales-registered commodities is increased such as exceeding a threshold. Accordingly, the occurrence of erroneous registration can be reduced as in the embodiment described above.

Modification 3

The recognition area Ab of the commodity recognition unit 202 is changed based on the total volume or the total number of the sales-registered commodities in the above-described embodiment, and there is no limitation on this example. The recognition area Ab may be changed based on an image captured by the imaging unit 34. Specifically, the recognition area changing unit 204 recognizes a state of a commodity housed in the housing unit 31 from the image acquired by the image acquisition unit 201, and changes the recognition area Ab in accordance with an area in which the recognized commodity is present. For example, if the recognition area changing unit 204 recognizes the presence of the commodity on a lower side of the image, the recognition area changing unit 204 changes the recognition area Ab by excluding an area including the recognized commodity from the recognition area Ab. Accordingly, the occurrence of erroneous registration can be reduced as in the embodiment described above.

As a recognition method for recognizing a commodity from an image by the recognition area changing unit 204, a method similar to that of the commodity recognition unit 202 can be used. The recognition area changing unit 204 may recognize the commodity housed in the housing unit 31 based on the recognition result of the commodity recognition unit 202. For example, a commodity in a substantially stationary state in continuous images may be recognized as the commodity housed in the housing unit 31.

Modification 4

The above-described embodiment describes that the commodity is housed in the housing unit 31 of the shopping cart 3, and there is no limitation on this example. A commodity may be housed in the housing unit 31 in another form. For example, a shopping basket or the like used when transporting a commodity in a store can also be an example of the housing unit 31. In this case, the imaging unit 34 is disposed in a vicinity of an edge of an opening of the shopping basket, and is disposed such that an inside of the shopping basket is included in at least a part of the imaging area.

In this case, a mobile terminal such as a smartphone having the same function as that of the tablet terminal 2 may be used instead of the tablet terminal 2. The shopping basket may be carried directly by a customer and moved, or may be moved in a state of being placed on the housing unit 31 of the shopping cart 3.

Modification 5

The tablet terminal 2 recognizes (and specifies) a commodity from the image captured by the imaging unit 34 in the above-described embodiment, and there is no limitation on this example. An external device such as the server 4 may recognize (and specify) the commodity. In this case, for example, the tablet terminal 2 may transmit an image captured by the image acquisition unit 201 to the server 4, and the server 4 may include a part or all of the commodity recognition unit 202, the registration processing unit 203, and the recognition area changing unit 204. In this case, the server 4 may perform recognition (and identification) of a commodity and sales registration processing based on the image transmitted from the tablet terminal 2.

The programs executed by the devices in the above-described embodiment (and modifications) are provided in a state of being incorporated in advance in a ROM, a storage unit, or the like. The programs executed by the devices in the above-described embodiment may be provided by being recorded in a computer-readable recording medium such as a CD-ROM, a flexible disk (FD), a CD-R, or a digital versatile disk (DVD) as a file in an installable or executable format.

Furthermore, the programs executed by the devices in the above-described embodiment may be stored in a computer connected to a network such as the Internet, and may be provided by being downloaded via the network. The programs executed by the devices in the above-described embodiment may be provided or distributed via a network such as the Internet.

While certain embodiments have been described, the embodiments have been presented by way of example, and are not intended to limit the scope of the disclosure. These novel embodiments and the modifications thereof can be implemented in various other forms, and various omissions, replacements, modifications, and combinations can be made without departing from the gist of the disclosure. The embodiments and the modifications thereof are included in the scope and the gist of the disclosure, and are included in a scope of the disclosure disclosed in the claims and equivalents thereof.

What is claimed is:

1. A commodity registration system, comprising:
an imaging component provided in a housing component configured to house a commodity that is a purchase target, an inside of the housing component being included in an imaging area, the housing component is comprised in a wheeled shopping cart or in a shopping basket;
a specifying component configured to recognize a commodity from an image captured by the imaging component and specify a commodity to be housed in the housing component based on the recognition result;
a registration component configured to register the commodity specified by the specifying component as the commodity that is the purchase target; and
a changing component configured to, based on a quantity of commodities registered by the registration component, change a recognition area in the imaging area from which the specifying component recognizes a commodity, wherein the imaging area does not change.

2. The commodity registration system according to claim 1, wherein
the changing component changes the recognition area based on a total volume of commodities registered by the registration component.

3. The commodity registration system according to claim 1, wherein
the changing component changes the recognition area based on a total number of commodities registered by the registration component.

4. The commodity registration system according to claim 1, wherein
when the commodity housed in the housing component is recognized from the image, the changing component excludes an area including the recognized commodity from the recognition area.

5. The commodity registration system according to claim 1, wherein
the specifying component specifies, based on the recognition result, a commodity to be picked up from the housing component, and
when the specifying component specifies the commodity to be picked up from the housing component, the registration component excludes the commodity from the purchase target.

6. The commodity registration system according to claim 1, wherein the registration component is further configured to register sales registration data by which the commodity is identified or the quantity of commodities to be purchased are identified.

7. The commodity registration system according to claim 1, wherein the registration component is further configured to register a commodity code of the commodity.

8. The commodity registration system according to claim 1, wherein the changing component is further configured to read, from a commodity master, volume information on the commodity corresponding to each of commodity codes registered in a sales registration table;
calculate a total volume of commodities housed in the housing component by adding values of the read volume information; and
change the recognition area in accordance with the calculated total volume.

9. A method of reducing an erroneous registration of a commodity, comprising:

housing a commodity that is a purchase target in a housing component comprising an imaging component, an inside of the housing component being included in an imaging area, the housing component is comprised in a wheeled shopping cart or in a shopping basket;

recognizing a commodity from an image captured by the imaging component and specifying a commodity to be housed in the housing component based on the recognition result;

registering the commodity specified as the commodity that is the purchase target; and based on a quantity of commodities registered, changing a recognition area in the imaging area from which recognizing a commodity occurs, wherein the imaging area does not change.

10. The method according to claim 9, further comprising:

changing the recognition area based on a total volume of commodities registered.

11. The method according to claim 9, further comprising:

changing the recognition area based on a total number of commodities registered.

12. The method according to claim 9, further comprising:

when the commodity housed in the housing component is recognized from the image, excluding an area including the recognized commodity from the recognition area.

13. The method according to claim 9, further comprising:

specifying, based on the recognition result, a commodity to be picked up from the housing component, and when specifying the commodity to be picked up from the housing component, excluding the commodity from the purchase target.

14. The method according to claim 9, further comprising:

when a customer places the commodity in the housing component, registering the commodity.

15. The method according to claim 9, further comprising:

when a customer picks up the commodity from the housing component, cancelling registration of the commodity.

16. The method according to claim 9, further comprising:

registering sales registration data by which the commodity is identified or the quantity of commodities to be purchased are identified.

17. The method according to claim 9, further comprising:

registering a commodity code of the commodity.

18. The method according to claim 9, further comprising:

reading, from a commodity master, volume information on the commodity corresponding to each of commodity codes registered in a sales registration table;

calculating a total volume of commodities housed in the housing component by adding values of the read volume information; and changing the recognition area in accordance with the calculated total volume.

* * * * *